United States Patent
Black et al.

(10) Patent No.: US 10,694,517 B2
(45) Date of Patent: *Jun. 23, 2020

(54) METHODS AND SYSTEMS FOR PROVIDING ENHANCED POSITION LOCATION IN WIRELESS COMMUNICATIONS

(71) Applicant: QUALCOMM Incorporated, San Diego, CA (US)

(72) Inventors: Peter John Black, San Diego, CA (US); Matthew Stuart Grob, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 15/849,455

(22) Filed: Dec. 20, 2017

(65) Prior Publication Data
US 2018/0115973 A1 Apr. 26, 2018

Related U.S. Application Data

(60) Continuation of application No. 14/288,971, filed on May 28, 2014, now Pat. No. 9,955,476, which is a
(Continued)

(51) Int. Cl.
*H04W 72/04* (2009.01)
*G01S 5/02* (2010.01)
(Continued)

(52) U.S. Cl.
CPC ....... *H04W 72/0446* (2013.01); *G01S 5/0221* (2013.01); *H04W 48/08* (2013.01); *H04W 64/00* (2013.01); *H04W 48/14* (2013.01)

(58) Field of Classification Search
CPC ................................................ H04W 72/0446
See application file for complete search history.

(56) References Cited

U.S. PATENT DOCUMENTS

| 4,901,307 A | 2/1990 | Gilhousen et al. |
| 5,267,261 A | 11/1993 | Blakeney, II et al. |

(Continued)

FOREIGN PATENT DOCUMENTS

| DE | 10031178 | 1/2002 |
| EP | 1376894 A1 | 1/2004 |

(Continued)

OTHER PUBLICATIONS

3rd Generation Partnership Project; Technical Specification Group Radio Access Network; Physical channels and mapping of transport channels onto physical channels (FDD) (Release 6), 3GPP Standard; Technical Specification; 25.211, 3rd Generation Partnership Project (3GPP), Mobile Competence Centre; Route Des Lucioles; F-06921, Sophia-Antipolis Cedex; France, vol. RAN WG2, No. V6.6.0, Sep. 2005, pp. 1-50.

3rd Generation Partnership Project; Technical Specification Group Radio Access Network; Stage 2 functional specification of User Equipment (UE) positioning in UTRAN (Release 7), 3GPP Standard; Technical Specification; 25.305, 3rd Generation Partnership Project (3GPP), Mobile Competence Centre; Route Des Lucioles; F-06921, Sophia-Antipolis Cedex; France, vol. RAN WG2, No. V7.1.0, Sep. 2005, pp. 1-75.

(Continued)

*Primary Examiner* — Andrew Lai
*Assistant Examiner* — Andrew C Lee
(74) *Attorney, Agent, or Firm* — Bala Ramasamy

(57) ABSTRACT

Embodiments disclosed herein relate to methods and systems for providing improved position location (e.g., time-of-arrival) measurement and enhanced position location in wireless communication systems. In an example method, an access terminal may receive a reference signal in a time slot, the reference signal comprising a sequence of symbols known to a receiver before being received, and may determine, based at least in part on the reference signal, a position location of the access terminal.

32 Claims, 11 Drawing Sheets

Related U.S. Application Data division of application No. 13/024,230, filed on Feb. 9, 2011, now Pat. No. 8,773,308, which is a continuation of application No. 11/313,321, filed on Dec. 20, 2005, now Pat. No. 7,893,873.

(51) Int. Cl.
*H04W 48/08* (2009.01)
*H04W 64/00* (2009.01)
*H04W 48/14* (2009.01)

(56) References Cited

U.S. PATENT DOCUMENTS

| | | | |
|---|---|---|---|
| 5,280,472 A | 1/1994 | Gilhousen et al. | |
| 5,694,388 A * | 12/1997 | Sawahashi | H04B 1/7075 370/206 |
| 5,717,861 A | 2/1998 | Rabii | |
| 5,737,327 A | 4/1998 | Ling et al. | |
| 5,796,776 A * | 8/1998 | Lomp | H04B 1/707 375/222 |
| 5,991,332 A | 11/1999 | Lomp et al. | |
| 6,038,263 A | 3/2000 | Kotzin et al. | |
| 6,078,284 A | 6/2000 | Levanon | |
| 6,141,542 A * | 10/2000 | Kotzin | H04B 7/061 370/331 |
| 6,175,588 B1 | 1/2001 | Visotsky et al. | |
| 6,175,744 B1 | 1/2001 | Esmailzadeh et al. | |
| 6,216,004 B1 | 4/2001 | Tiedemann, Jr. et al. | |
| 6,266,534 B1 | 7/2001 | Raith et al. | |
| 6,269,088 B1 * | 7/2001 | Masui | H04B 7/2637 370/335 |
| 6,385,187 B1 | 5/2002 | Ahn et al. | |
| 6,452,917 B1 | 9/2002 | Leung | |
| 6,510,173 B1 | 1/2003 | Garmonov et al. | |
| 6,671,514 B1 * | 12/2003 | Cedervall | G01S 5/02 455/450 |
| 6,721,299 B1 | 4/2004 | Song | |
| 6,778,507 B1 | 8/2004 | Jalali | |
| 6,791,960 B1 | 9/2004 | Song | |
| 6,804,264 B1 | 10/2004 | Song | |
| 6,859,445 B1 | 2/2005 | Moon et al. | |
| 6,898,197 B1 * | 5/2005 | Lavean | H04B 1/707 342/357.64 |
| 6,931,030 B1 | 8/2005 | Dogan | |
| 6,992,618 B2 | 1/2006 | Bhatia et al. | |
| 7,046,978 B2 | 5/2006 | Burke et al. | |
| 7,085,537 B2 | 8/2006 | Fernandez-Corbaton et al. | |
| 7,177,348 B2 | 2/2007 | Yang | |
| 7,206,554 B1 | 4/2007 | Lindskog | |
| 7,653,021 B2 | 1/2010 | Schulist | |
| 7,756,196 B1 | 7/2010 | Despain et al. | |
| 7,876,265 B2 | 1/2011 | Black et al. | |
| 7,893,873 B2 | 2/2011 | Black et al. | |
| 7,893,973 B2 | 2/2011 | Du et al. | |
| 7,995,664 B2 * | 8/2011 | Ihm | H04B 7/0669 370/208 |
| 8,169,956 B2 | 5/2012 | Malladi | |
| 8,179,833 B2 | 5/2012 | Attar et al. | |
| 8,218,663 B2 | 7/2012 | Muharemovic et al. | |
| 8,694,388 B2 | 4/2014 | Kwak | |
| 8,773,308 B2 * | 7/2014 | Black | G01S 5/0221 342/385 |
| 8,842,768 B2 | 9/2014 | Moulsley et al. | |
| 9,955,476 B2 * | 4/2018 | Black | G01S 5/0221 |
| 2001/0014588 A1 | 8/2001 | Ishida | |
| 2001/0030948 A1 * | 10/2001 | Tiedemann, Jr. | H04W 52/40 370/305 |
| 2001/0033559 A1 * | 10/2001 | Masui | H04B 7/2637 370/335 |
| 2002/0054621 A1 * | 5/2002 | Kyeong | H04B 7/01 375/147 |
| 2002/0057661 A1 | 5/2002 | Raith | |
| 2002/0064182 A1 | 5/2002 | Hoffmann et al. | |
| 2002/0071445 A1 | 6/2002 | Wu et al. | |
| 2002/0080024 A1 | 6/2002 | Nelson et al. | |
| 2002/0115464 A1 * | 8/2002 | Hwang | H04W 52/40 455/522 |
| 2002/0142791 A1 | 10/2002 | Chen et al. | |
| 2003/0002461 A1 | 1/2003 | Chaponniere et al. | |
| 2003/0036359 A1 | 2/2003 | Dent et al. | |
| 2003/0125046 A1 | 7/2003 | Riley et al. | |
| 2003/0162547 A1 | 8/2003 | McNair | |
| 2003/0176201 A1 | 9/2003 | Sih et al. | |
| 2003/0176203 A1 * | 9/2003 | Sih | H04W 52/282 455/522 |
| 2003/0224836 A1 | 12/2003 | Tsai et al. | |
| 2004/0008760 A1 | 1/2004 | Dogan | |
| 2004/0157610 A1 | 8/2004 | Black et al. | |
| 2004/0162030 A1 | 8/2004 | Malladi et al. | |
| 2004/0166887 A1 | 8/2004 | Laroia et al. | |
| 2004/0179469 A1 | 9/2004 | Attar et al. | |
| 2004/0181569 A1 * | 9/2004 | Attar | H04W 52/48 709/200 |
| 2004/0193971 A1 * | 9/2004 | Soong | H04L 1/0002 714/704 |
| 2004/0198386 A1 * | 10/2004 | Dupray | H04W 64/00 455/456.1 |
| 2004/0203864 A1 | 10/2004 | Dibuduo | |
| 2004/0219931 A1 | 11/2004 | Bi et al. | |
| 2004/0258134 A1 | 12/2004 | Cho et al. | |
| 2005/0009551 A1 * | 1/2005 | Tsai | H04W 28/18 455/522 |
| 2005/0030926 A1 * | 2/2005 | Qian | H04W 52/32 370/335 |
| 2005/0047496 A1 | 3/2005 | McIntire et al. | |
| 2005/0099939 A1 | 5/2005 | Huh et al. | |
| 2005/0123138 A1 | 6/2005 | Abe et al. | |
| 2005/0135324 A1 | 6/2005 | Kim et al. | |
| 2005/0141628 A1 | 6/2005 | Cheng | |
| 2005/0192026 A1 * | 9/2005 | Carlson | G01S 5/06 455/456.1 |
| 2005/0215289 A1 | 9/2005 | Rensburg et al. | |
| 2005/0232135 A1 | 10/2005 | Mukai et al. | |
| 2005/0281324 A1 | 12/2005 | Wallen et al. | |
| 2006/0002453 A1 | 1/2006 | Song | |
| 2006/0007850 A1 | 1/2006 | Park et al. | |
| 2006/0013292 A1 | 1/2006 | Despain | |
| 2006/0028976 A1 * | 2/2006 | Park | H04L 5/0023 370/203 |
| 2006/0068732 A1 * | 3/2006 | Jin | H03G 3/3052 455/232.1 |
| 2006/0092881 A1 | 5/2006 | Laroia et al. | |
| 2006/0094363 A1 | 5/2006 | Kang et al. | |
| 2006/0126491 A1 | 6/2006 | Ro et al. | |
| 2006/0199577 A1 | 9/2006 | Ramakrishna | |
| 2007/0104280 A1 | 5/2007 | Ibrahim et al. | |
| 2007/0139267 A1 * | 6/2007 | Black | H04W 72/0446 342/385 |
| 2008/0070615 A1 | 3/2008 | Obuchi et al. | |
| 2009/0135791 A1 | 5/2009 | Kawamura et al. | |
| 2009/0175156 A1 * | 7/2009 | Xu | H04B 3/32 370/201 |
| 2009/0185602 A1 * | 7/2009 | Atarashi | H04B 1/7103 375/141 |
| 2010/0029278 A1 | 2/2010 | Fang et al. | |
| 2010/0118807 A1 | 5/2010 | Seo et al. | |
| 2010/0158256 A1 * | 6/2010 | Sawahashi | H04J 13/16 380/287 |
| 2010/0189189 A1 | 7/2010 | Hoshino et al. | |
| 2010/0220607 A1 | 9/2010 | Fujishima et al. | |
| 2011/0075706 A1 | 3/2011 | Cairns et al. | |
| 2012/0195211 A1 | 8/2012 | Jonsson et al. | |
| 2014/0269638 A1 | 9/2014 | Black et al. | |

FOREIGN PATENT DOCUMENTS

| | | |
|---|---|---|
| EP | 1505742 A2 | 2/2005 |
| JP | 7181242 | 7/1995 |
| JP | 2001523337 T | 11/2001 |
| JP | 2001339753 A | 12/2001 |
| JP | 2002077014 A | 3/2002 |
| JP | 2002544734 A | 12/2002 |

(56) References Cited

FOREIGN PATENT DOCUMENTS

| | | |
|---|---|---|
| JP | 2003259424 A | 9/2003 |
| RU | 2233045 C2 | 7/2004 |
| TW | 200407043 | 5/2004 |
| WO | WO-1998014796 | 4/1998 |
| WO | WO-9832267 A1 | 7/1998 |
| WO | WO-1998039858 | 9/1998 |
| WO | WO-1999023844 | 5/1999 |
| WO | WO-0069205 A1 | 11/2000 |
| WO | WO-2001017131 | 3/2001 |
| WO | WO-03067785 A1 | 8/2003 |
| WO | WO-2005048640 A1 | 5/2005 |
| WO | WO-05088336 | 9/2005 |
| WO | WO-2005098466 A1 | 10/2005 |

OTHER PUBLICATIONS

European Search Report—EP19162343—Search Authority—Munich—dated Apr. 10, 2019.
European Search Report—EP17203014—Search Authority—Munich—dated Jan. 2, 2018.
International Search Report—PCT/US06/061901, International Search Authority—European Patent Office—dated Dec. 14, 2007.
Taiwanese Search report—095148043—TIPO—dated Dec. 27, 2010.
Written Opinion PCT/US2006/061901 International Search Authority European Patent Office, dated Dec. 14, 2007.

* cited by examiner

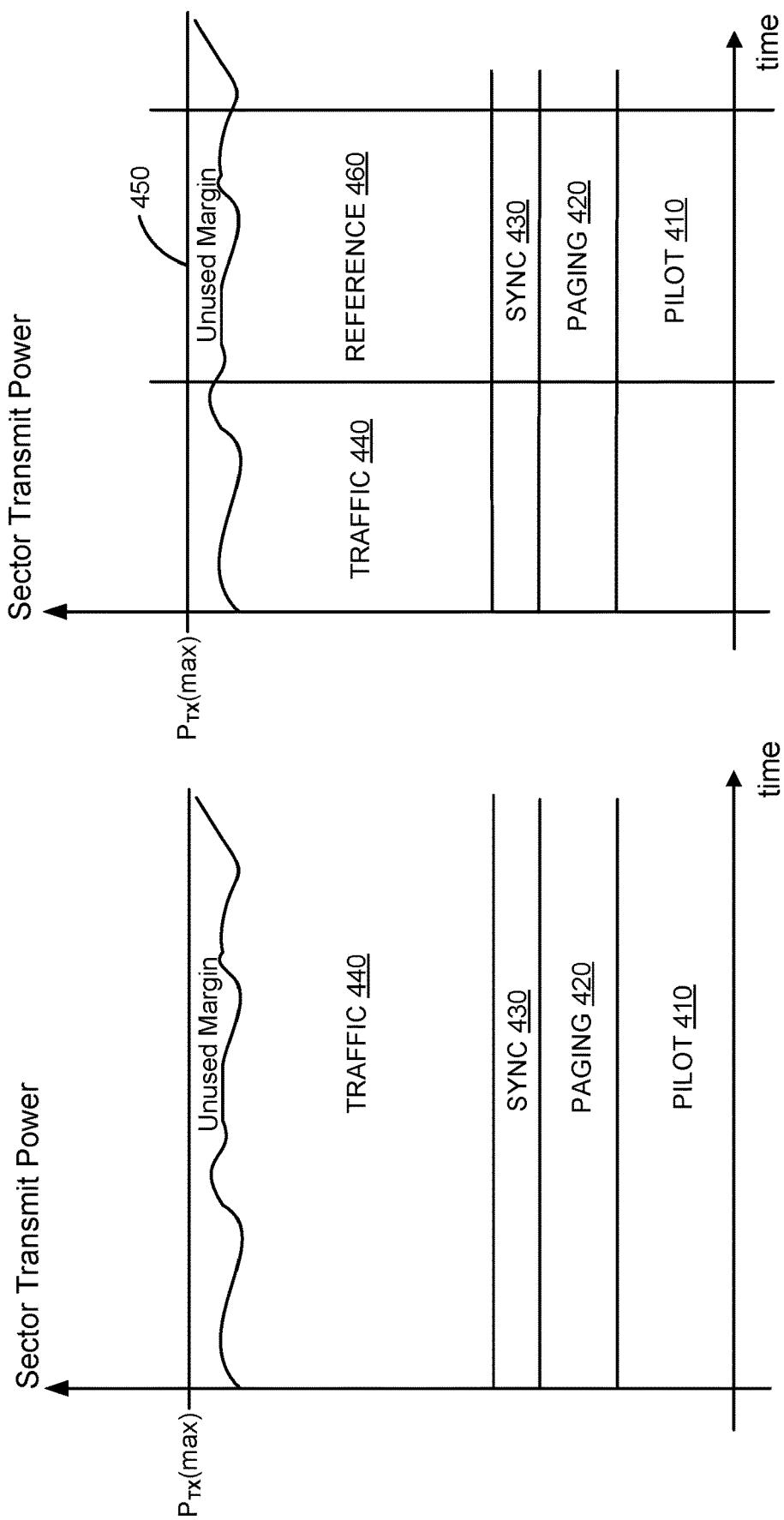

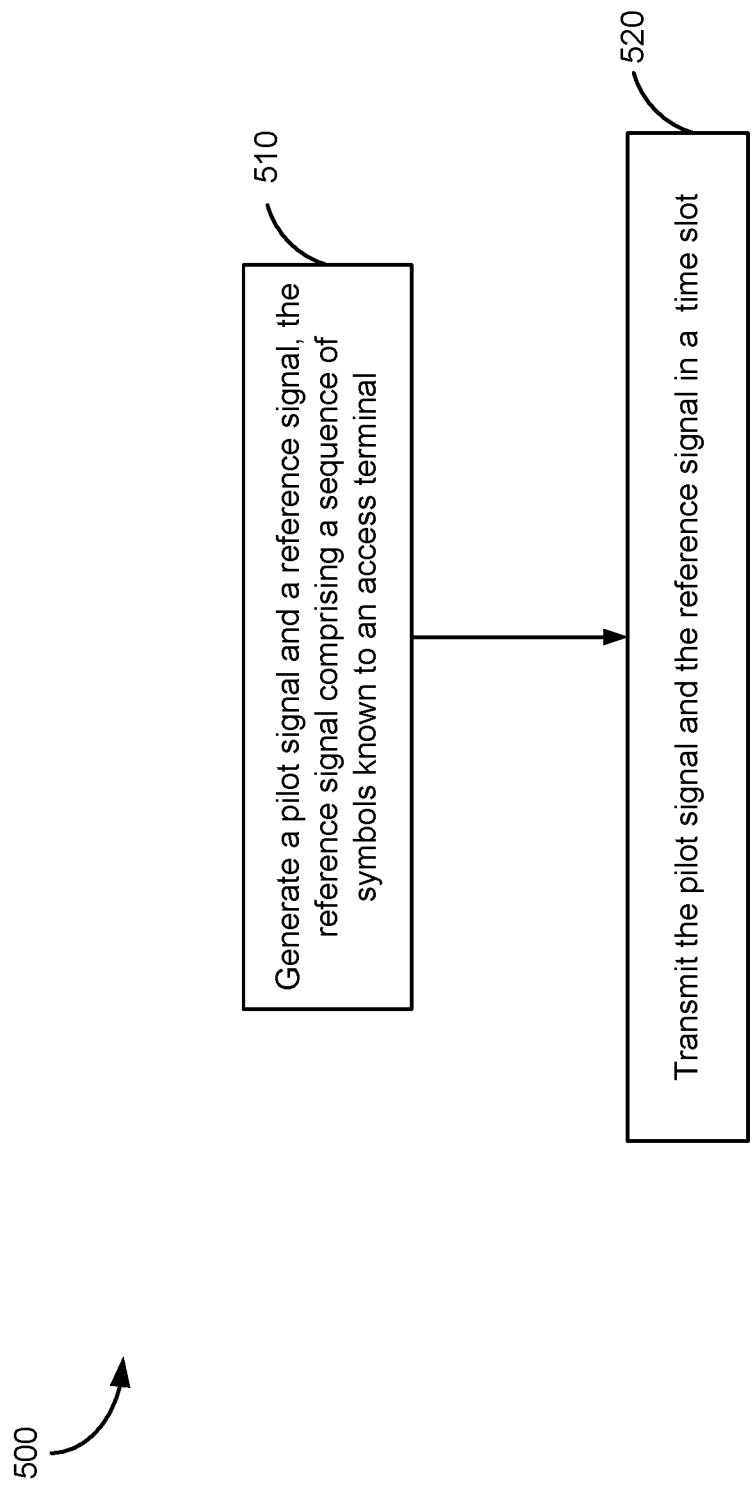

METHODS AND SYSTEMS FOR PROVIDING ENHANCED POSITION LOCATION IN WIRELESS COMMUNICATIONS

The present application is a continuation of U.S. patent application Ser. No. 14/288,971, entitled "METHODS AND SYSTEMS FOR PROVIDING ENHANCED POSITION LOCATION IN WIRELESS COMMUNICATIONS", filed May 28, 2014, now allowed, which is divisional of U.S. patent application Ser. No. 13/024,230, entitled "METHODS AND SYSTEMS FOR PROVIDING ENHANCED POSITION LOCATION IN WIRELESS COMMUNICATIONS", filed Feb. 9, 2011, issued as U.S. Pat. No. 8,773,308, which is a continuation application of U.S. patent application Ser. No. 11/313,321, entitled "METHODS AND SYSTEMS FOR PROVIDING ENHANCED POSITION LOCATION IN WIRELESS COMMUNICATIONS", filed Dec. 20, 2005, issued as U.S. Pat. No. 7,893,873, the entireties of which all are incorporated by reference herein.

FIELD

This disclosure relates generally to wireless communications. More specifically, embodiments disclosed herein relate to providing improved time-of-arrival measurement and enhanced position location in wireless communication systems.

BACKGROUND

Wireless communication systems are widely deployed to provide various types of communications (such as voice and data) to multiple users. Such systems may be based on code division multiple access (CDMA), time division multiple access (TDMA), frequency division multiple access (FDMA), or other multiple access techniques. A wireless communication system may be designed to implement one or more standards, such as IS-95, cdma2000, IS-856, W-CDMA, TD-SCDMA, and other standards.

Presence detection and location-based services have long been sought after in wireless communications. In addition to supporting emergency services (e.g., E911 calls), wireless operators are striving to provide a wide range of new applications targeted for the everyday consumer and enterprise user, such as child locators, turn-by-turn navigation, directory services, voice concierge, roadside assistance, and many others. A challenge hence lies in providing accurate and reliable position location to enable such applications.

BRIEF DESCRIPTION OF THE DRAWINGS

FIG. 4A illustrates an embodiment of forward link structure in an IS-95 type system;

FIG. 4B illustrates an embodiment of forward link structure for reference transmission;

FIG. 5 illustrates a flow diagram of a process, which may be used to implement some disclosed embodiments;

DETAILED DESCRIPTION

Embodiments disclosed herein relate to methods and systems for providing enhanced position location in wireless communication systems.

An access point (AP) disclosed herein may include and/or implement functions of a base-station transceiver system (BTS), an access network transceiver (ANT), a modem pool transceiver (MPT), or a Node B (e.g., in a W-CDMA type system), etc. A cell may refer to a coverage area serviced by an AP. A cell may further include one or more sectors. For simplicity and clarity, the term "sector" may be used herein to refer a cell, or a section of a cell, serviced by an AP. Further, an access network controller (ANC) may refer to the portion of a communication system configured to interface with a core network (e.g., a packet data network) and route data packets between access terminals (ATs) and the core network, perform various radio access and link maintenance functions (such as soft handoff), control radio transmitters and receivers, and so on. An ANC may include and/or implement the functions of a base station controller (BSC), such as found in a $2^{nd}$, $3^{rd}$ or $4^{th}$ generation wireless network. An ANC and one or more APs may constitute part of an access network (AN).

An access terminal (AT) described herein may refer to various types of devices, including (but not limited to) a wireless phone, a cellular phone, a laptop computer, a multimedia wireless device, a wireless communication personal computer (PC) card, a personal digital assistant (PDA), an external or internal modem, etc. An AT may be any data device that communicates through a wireless channel and/or through a wired channel (e.g., by way of fiber optic or coaxial cables). An AT may have various names, such as access unit, access node, subscriber unit, mobile station, mobile device, mobile unit, mobile phone, mobile, remote station, remote terminal, remote unit, user device, user equipment, handheld device, etc. Different ATs may be incorporated into a system. ATs may be mobile or stationary, and may be dispersed throughout a communication system. An AT may communicate with one or more APs on a forward link and/or a reverse link at a given moment. The forward link (or downlink) refers to transmission from an AP to an AT. The reverse link (or uplink) refers to transmission from the AT to the AP.

Locating a person or an object wirelessly may be achieved in a number of ways. Time-of-arrival (TOA) measurement, which uses time it takes for a signal to travel as an indirect method of calculating distance, is commonly involved in a number of network-based methods. For example, in some wireless networks, position location services require TOA measurement of the pilot signal (e.g., the earliest path of the pilot).

Figure 1:
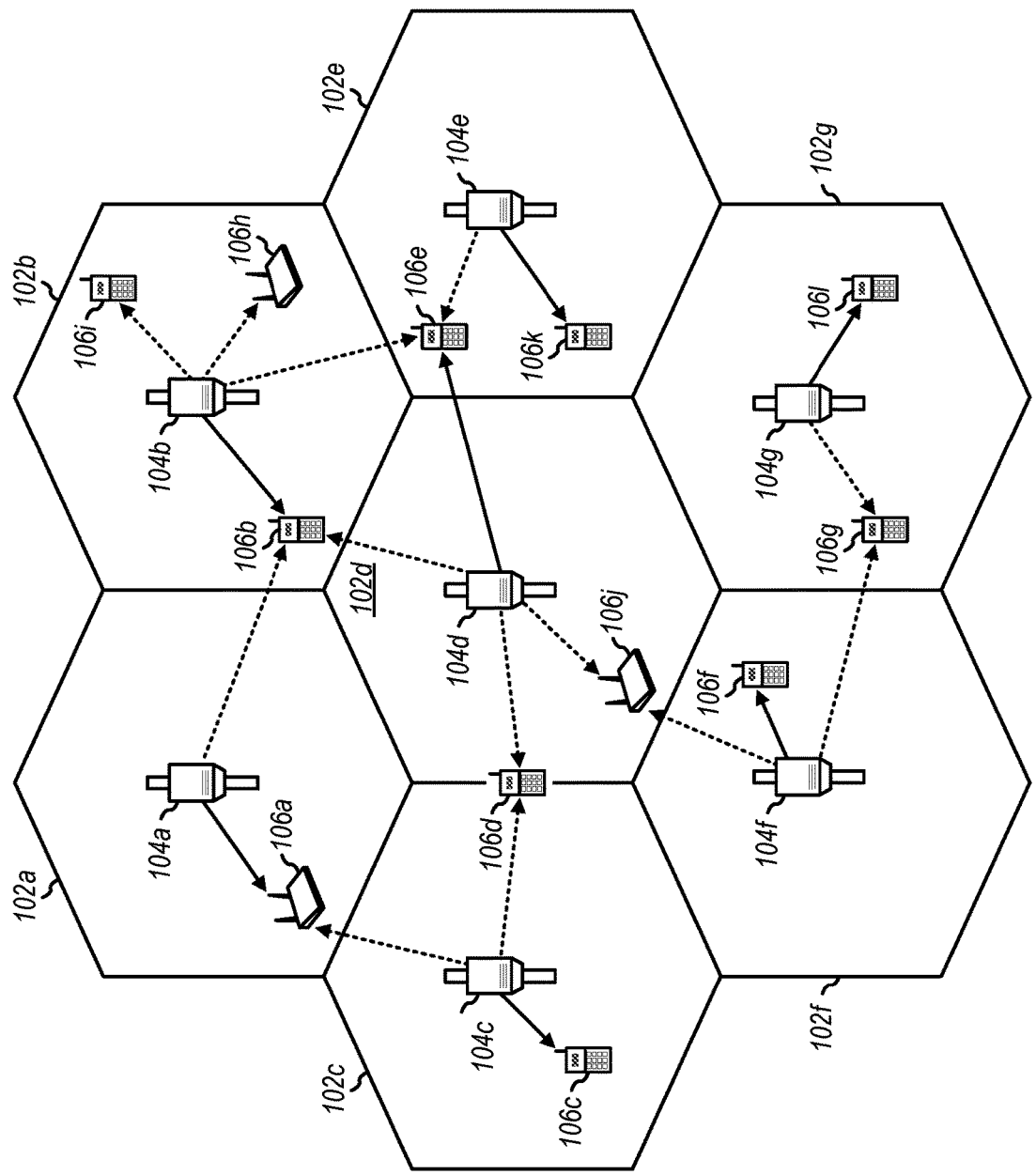
FIG. 1 illustrates an embodiment of a wireless communication system.

FIG. 1 illustrates a wireless communication system 100 configured to support a number of users, in which various disclosed embodiments and aspects may be implemented, as further described below. By way of example, system 100 provides communication for a number of cells 102, including cells 102a-102g, with each cell being serviced by a corresponding AP 104 (such as APs 104a-104g). Each cell may be further divided into one or more sectors. Various ATs 106, including ATs 106a-106k, are dispersed throughout the system. Each AT 106 may communicate with one or more APs 104 on a forward link and/or a reverse link at a given moment, depending upon whether the AT is active and whether it is in soft handoff, for example.

In FIG. 1, a solid line with an arrow may indicate information (e.g., data) transmission from an AP to an AT. A broken line with an arrow may indicate that the AT is receiving the pilot and other signaling/reference signals, but no data transmission, from the AP, as further described below. For clarity and simplicity, the reverse link communication is not explicitly shown in FIG. 1.

In a high rate packet data (HRPD) system (e.g., as specified in "cdma2000 High Rate Packet Data Air Interface Specification," 3GPP2 C.S0024-A, Version 2, July 2005, referred to as "1×EV-DO" (or "IS-856") herein), for example, transmission on forward link is partitioned into a sequence of frames; each frame is further divided into time slots (e.g., 16 slots each with a duration of 1.667 msec); and each slot includes a plurality of time-division-multiplexed channels.

Figure 2:
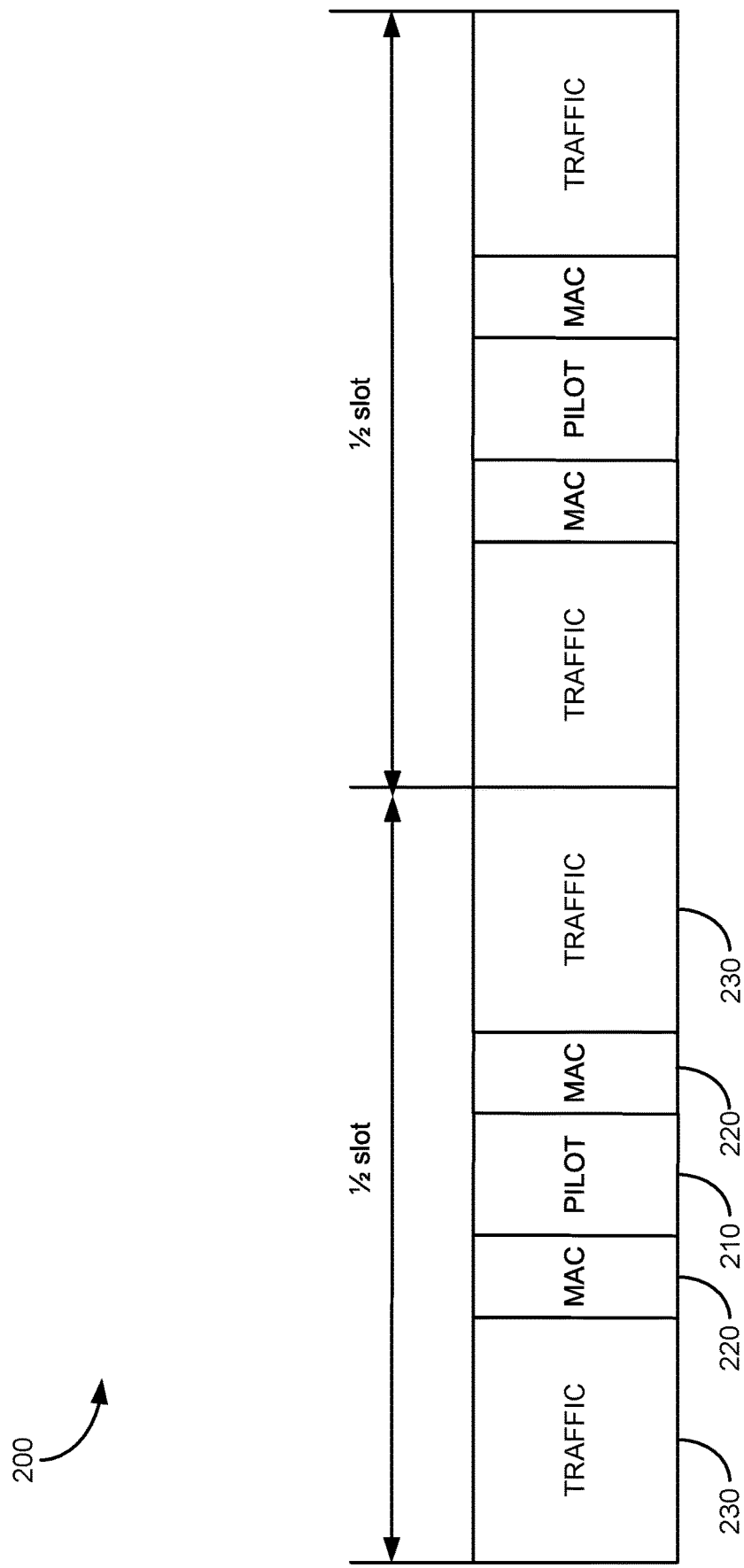
FIG. 2 illustrates an embodiment of forward link slot structure in an IS-856 type system.

By way of example, FIG. 2 illustrates an embodiment of a forward link slot structure 200, such as employed in a 1×EV-DO type system. Time slot 200 is divided into two half-slots, with each half-slot having the following channel assignments: pilot channel 210, forward medium access control (MAC) channel 220, and forward traffic (or control) channel 230. Pilot channel 210 carries the pilot signal (also commonly termed as the pilot) used by an AT (such as AT 106 in FIG. 1) for initial acquisition, phase recovery, timing recovery, radio combining, as well as estimating the channel conditions on forward link (e.g., by way of the signal-to-noise-and-interference (SINR) measurement). MAC channel 220 sets forth the procedures used to receive and transmit over the physical layer (which provides the channel structure, frequency, power output, modulation, encoding specifications for forward and reverse links). Traffic channel 230 may carry information or data (e.g., by way of physical layer packets), e.g., unicast data specific to a particular AT (or user), or broadcast/multicast data to a group of users (e.g., as specified in "cdma2000 High Rate Broadcast-Multicast Packet Data Air Interface Specification," 3GPP2 C.S0054-0, Version 2.0, July 2005, referred to as "BCMCS specification" herein). Traffic channel 230 may also be used to carry control messages. Further, pilot channel 210, MAC channel 220, and traffic channel 230 are time-division-multiplexed within time slot 200. When there is no traffic on traffic channel 230, an idle slot including pilot channel 210 and MAC channel 220 may be sent. Transmission of idle slots serves to decrease interference to other cells on forward link.

As illustrated in FIG. 2, pilot channel 210 is transmitted in discrete bursts (as opposed to being continuous in time), hence having limited power. In some systems, for example, pilot channel 210 may comprise 96 chips of a particular digital pattern (e.g., all zeros), MAC channel 220 may comprise 64 chips, and each half-slot may comprise 1024 chips. Thus, only a small fraction (e.g., 96/1024) of the available forward link power is allotted to the pilot channel in such systems. As a result, TOA measurement based on such pilot channel may be susceptible to errors (e.g., particularly when the forward link channel conditions are poor), hence, compromising the accuracy and reliability of associated position location. A need therefore exists for a strong and clear signal to assist position location.

Embodiments disclosed herein relate to methods and systems for providing improved TOA measurement and enhanced position location in wireless communication systems.

In an embodiment, an AP may replace normal information (e.g., data) transmission by a "known" transmission (termed "reference transmission" herein) at a predetermined time known to ATs in sectors serviced by the AP. The ATs may use the received reference transmission to assist or facilitate position location (e.g., TOA and/or other position-location measurements). The AP may also send a reference transmission on demand, e.g., in response to a request from an AT (which may be in need for a location-based service).

In some embodiments, the reference transmission may include a time slot having a pilot signal and a reference signal in a time-division-multiplexed format. In other embodiments, the reference transmission may include a time slot having a pilot signal and a reference in a code-division-multiplexed format. The reference signal may be similar or substantially identical to the pilot, such that the entire time slot is nearly filled with the pilot, thereby providing a strong signal for TOA and other position-location measurements. The reference signal may also be different from the pilot, e.g., configured to assist the pilot in position location. The ensuing description provides further embodiments and examples.

The term "reference signal" disclosed herein may include any signal that is unmodulated (e.g., carrying no information or data) and known to a receiving AT. For example, the reference signal may comprise a digital pattern (e.g., a sequence of symbols) that is "known" in advance to the receiving AT, whereby the AT does not need to decode the reference signal. The reference may carry a unique sector ID (e.g., spread with a pseudorandom (PN) code with a unique offset specific to the sector). The reference signal may be transmitted at substantially the maximum power available to the sector (or "full sector power"). In some embodiments, the reference signal may be a spread-spectrum or other wideband signal (e.g., to occupy the entire traffic channel). A "reference transmission" disclosed herein may refer to a forward link transmission including a reference signal. Further, the term "position-location measurement" may broadly refer to a measurement associated with position location, including (but not limited to) TOA, time difference of arrival (TDOA), angle of arrival (AOA), advanced forward link trilateration (AFLT), enhanced observed time difference (EOTD), and others.

Various aspects, features, and embodiments are described in further detail below.

Figure 3A:
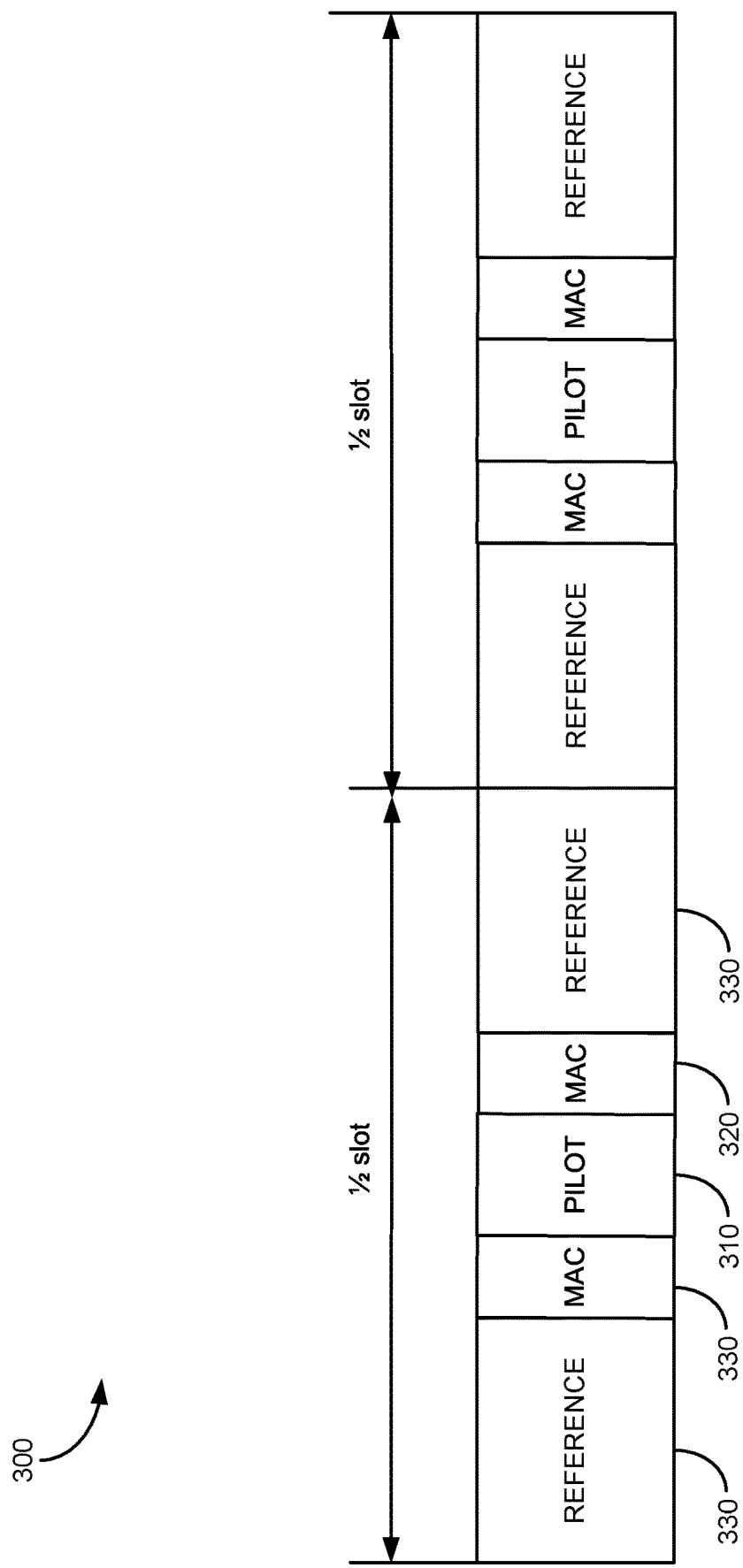
FIGS. 3A-3B illustrate embodiments of forward link slot structure for reference transmission.

FIG. 3A illustrates an embodiment of a reference transmission including a time slot 300, which may be used to implement some disclosed embodiments. Time slot 300 is shown in two half-slots, each having pilot channel 310, MAC channel 320, and traffic channel 330 in a time-division-multiplexed format. Pilot channel 310 carries the pilot. Pilot channel 310 and MAC channel 320 may for example be substantially as described above with respect to the embodiment of FIG. 2. Traffic channel 330 carries a reference signal, in lieu of data.

Figure 3B:
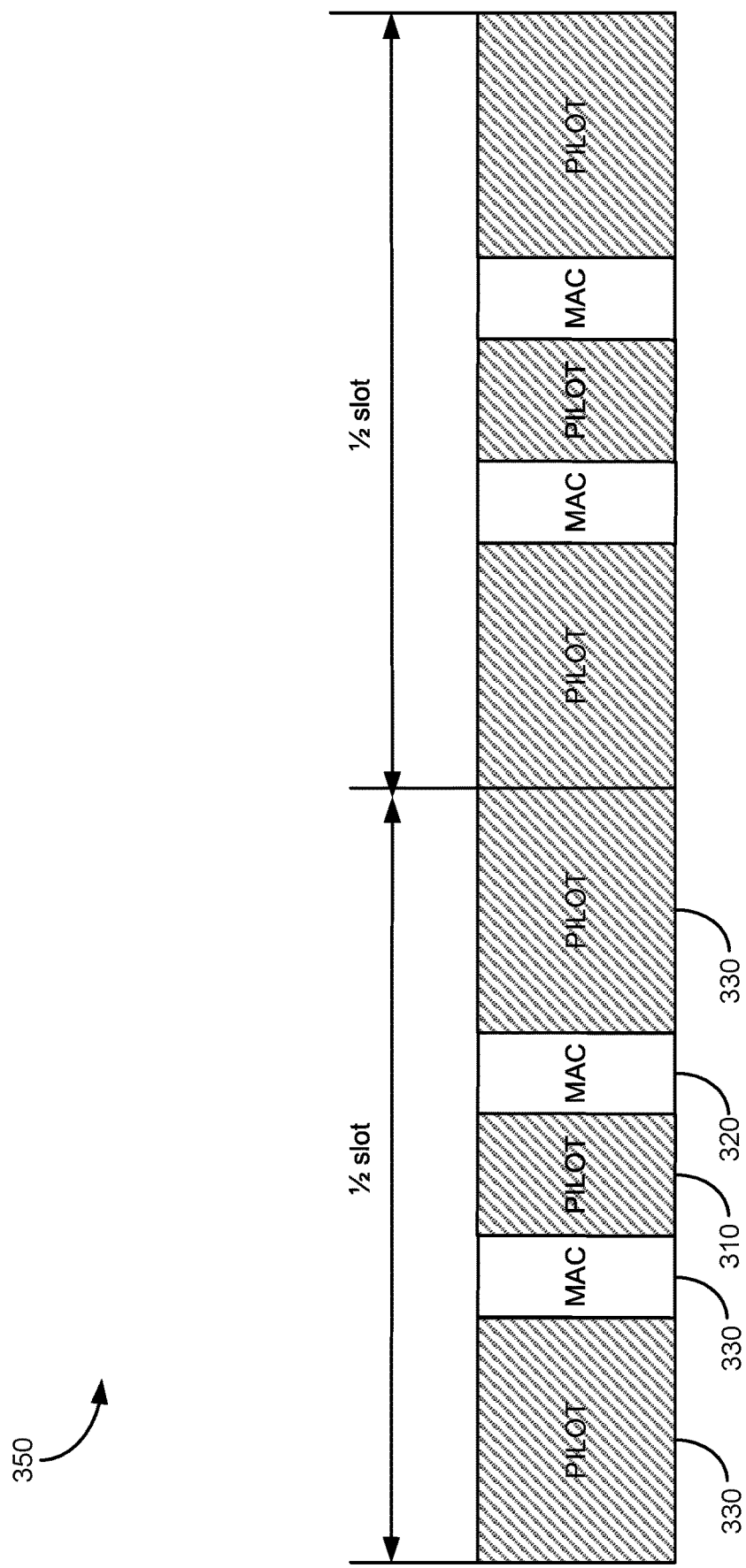

In some embodiments, the reference signal may be similar or substantially identical to the pilot, as time slot 350 of FIG. 3B illustrates. As a result, the entire slot 350 is nearly filled with the pilot, as graphically illustrated by the hatched area in the figure, and the full power of the entire sector may be substantially devoted to the pilot transmission during this time period. This strong pilot allows the receiving ATs to carry out more accurate and reliable TOA and other position-location measurements. The timing and signaling for such "pilot slot" may for example be according to the broadcast/multicast channel structure in a 1×EV-DO type system (e.g., as specified in the BCMCS specification). Further, implementation of such "pilot slot" imposes minimal changes to the existing network infrastructures and devices.

In other embodiments, the reference signal may be different from the pilot. The timing and signaling for the reference transmission may for example be according to the broadcast/multicast channel structure in a 1×EV-DO type system (e.g., as specified in the BCMCS specification). In one embodiment, for example, the pilot may comprise a sequence of symbols having all zeros (0's), whereas the reference signal may comprise a sequence of symbols having all ones (1's). In another embodiment, the pilot may comprise the pilot symbols used in a 1×EV-DO type system, whereas the reference signal may comprise the pilot symbols used in an IS-95 type system. In yet another embodiment, the pilot may comprise a particular sequence of symbols, while the reference signal may comprise the sequence configured in reverse. In an alternative embodiment, a known data packet may be transmitted as the reference signal, e.g., using the broadcast/multicast channel structure and signaling in a 1×EV-DO type system (e.g., as specified in the BCMCS specification). A receiving AT may use this reference signal to search for the (weaker) pilot, estimate TOA (and/or perform other position-location measurements), and report back the measured information.

In an embodiment, the reference transmission may be carried out by an AP according to a predetermined schedule (e.g., on a regular or periodic basis), so that at known times, ATs in the corresponding sectors may be prepared to perform TOA and/or other position-location measurements, and report back the measured information.

In an embodiment, an AP may carry out the reference transmission on demand, e.g., upon receiving a request from an AT (which may be in need for a location-based service).

In an embodiment, an AP may make use of idle slots for reference transmission (e.g., filing an idle slot substantially with the pilot, such as described above with respect to the embodiment of FIG. 3B), so as to make efficient use of the network resources. For example, the signaling associated with such time slot may indicate to a receiving AT the reference signal carried by the traffic channel, so that the AT may accordingly perform TOA and/or other position-location measurements.

FIGS. 3A-3B provide some examples of transmitting a reference signal along the pilot in a time-division-multiplexed format. In other systems (e.g., as specified in "Physical Layer Standard for cdma2000 Spectrum Systems," 3GPP2 C.S0002-D, Version 2.0, September 2005, referred to as "CDMA2000 1×" herein, or as specified in "Mobile Station-Base Station Compatibility Standard for Wideband Spread Spectrum Cellular Systems," ANSI/TIA/EIA-95-B-99, referred to as "IS-95" herein), a reference signal may be transmitted along with the pilot in a code-division-multiplexed format, such as described below.

FIG. 4A illustrates an embodiment of forward link structure in the form of sector power usage vs. time, such as in an IS-95 or CDMA2000 1×type system. Forward link channels, including pilot channel 410, sync channel 420, paging channel 430, and traffic channels 440, are transmitted in a code-division-multiplexed format, each with a certain fraction of the total sector power. For example, pilot channel 410 may be allotted approximately 15-20% of the maximum sector power, denoted as $P_{Tx}(max)$. To augment the pilot (e.g., for position location purposes), some or all of the power allotted to traffic channels 440 may be used to transmit a reference signal (in lieu of information transmission) in a specific period of time, such as illustrated in FIG. 4B below.

For illustration and clarity, FIG. 4B depicts an embodiment in which the power allotted to traffic channels 440 may be substantially devoted to transmit a reference signal 460 in a time slot 450. For example, such may occur in situations where an AP sends a reference transmission to the corresponding ATs according to a predetermined schedule (e.g., on a regular or periodical basis), so that at known times, the ATs may be prepared to perform position-location measurements and report back the measured information. In some embodiments, the reference signal may be similar or substantially identical to the pilot; as a result, the entire time slot 450 may be nearly filled with the pilot, thereby providing a strong signal for position-location measurements. In other embodiments, the reference may also be different from the pilot, such as described above.

In alternative embodiments, a fraction of the power allotted to traffic channels 440 may be used to transmit reference signal 460 in time slot 450. For example, such may occur in situations where an AP carries out a reference transmission on demand, e.g., in response to request(s) from one or more ATs in the corresponding sectors (which may be in need for position-location services).

In addition to replacing information transmission by a reference transmission according to a predetermined schedule or on demand (such as described above), a portion of the control channel (e.g., the preamble), or other existing (or known) signals, may be used to assist the pilot in position location. For example, in some systems, the control channel may be transmitted on a regular or periodic basis. The preamble of the control channel may be known to a receiving AT (e.g., after the initial set-up), and therefore, used to assist the pilot in position location (such as in a manner described above with respect to the reference signal).

FIG. 5 illustrates a flow diagram of a process 500, which may be used to implement some disclosed embodiments (such as described above). Step 510 generates a pilot signal and a reference signal, the reference signal comprising a sequence of symbols known to an access terminal. Step 520 transmits the pilot signal and the reference signal in a time slot.

In process 500, the pilot signal and the reference signal may be transmitted in a time-division-multiplexed format or code-division-multiplexed format, such as described above. In some embodiments, the reference signal may be similar or substantially identical to the pilot signal. In other embodiments, the reference signal may be different from the pilot signal, e.g., configured to assist the pilot signal in position location (e.g., TOA and other position-location measurements), such as described above. Further, in a multi-carrier wireless communication system, the time slot may be transmitted on a subset (e.g., some, all, or any combination) of carriers.

Figure 6:
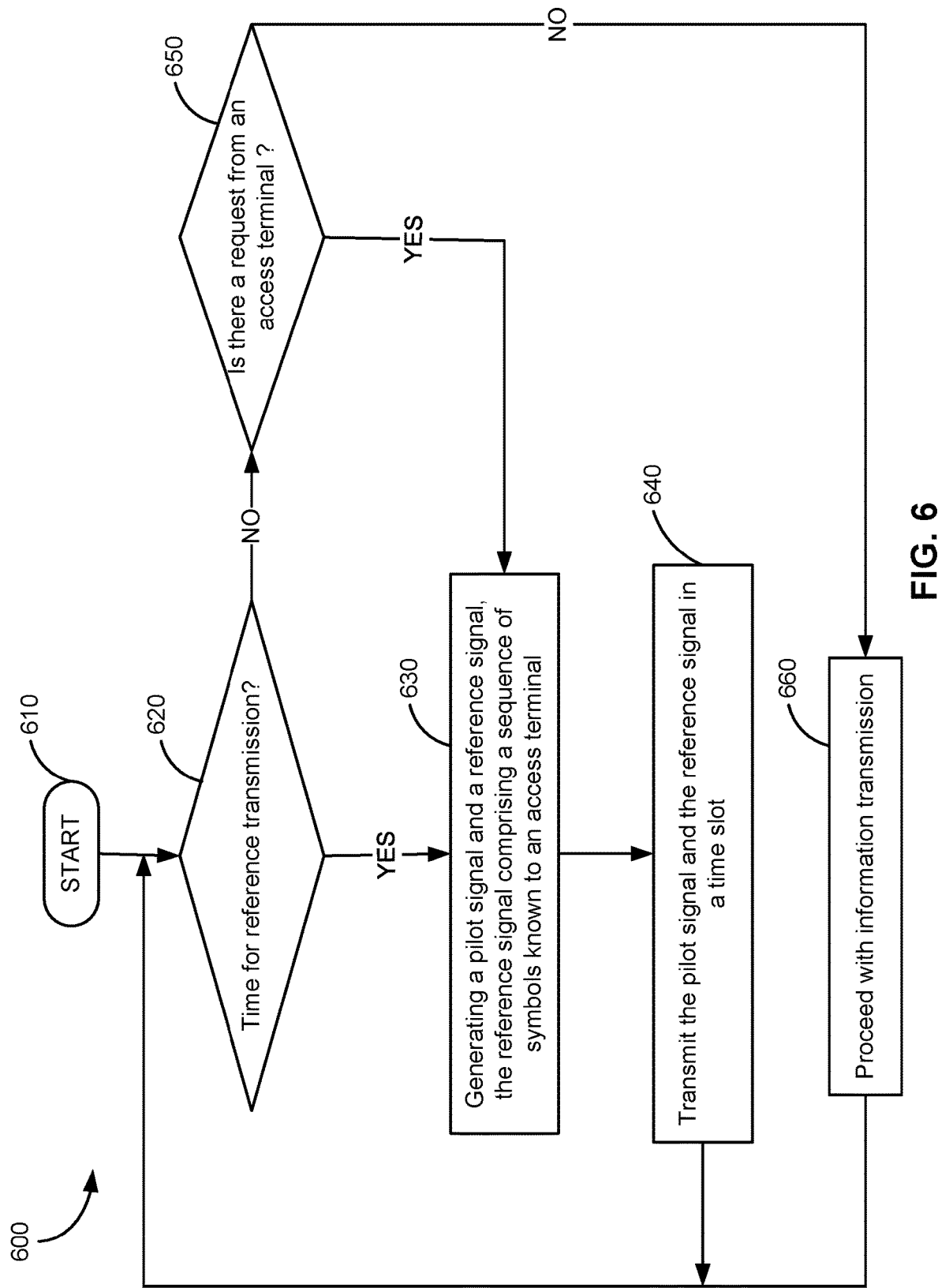
FIG. 6 illustrates a flow diagram of a process, which may be used to implement some disclosed embodiments.

FIG. 6 illustrates a flow diagram of a process 600, which may be used to implement some disclosed embodiments (such as described above). Process 600 starts at step 610. Step 620 determines (e.g., based on a predetermined schedule) whether it is time for carrying out a reference transmission to ATs in sectors serviced by an AP. If the outcome of step 620 is "YES," step 630 follows and generates a pilot signal and a reference signal. Step 640 transmits the pilot signal and the reference signal in a time slot (e.g., in a time-division-multiplexed or code-division-multiplexed format, such as described above). Subsequently, process 600 returns to step 620.

In process 600, if the outcome of step 620 is "NO," step 650 follows and determines if there is a request for a location-based service from an AT. If the outcome of step 650 is "YES," process 600 returns to step 630. If the outcome of step 650 is "NO," step 660 follows and proceeds with information (e.g., data) transmission. Process 600 subsequently returns to step 620.

Figure 7:
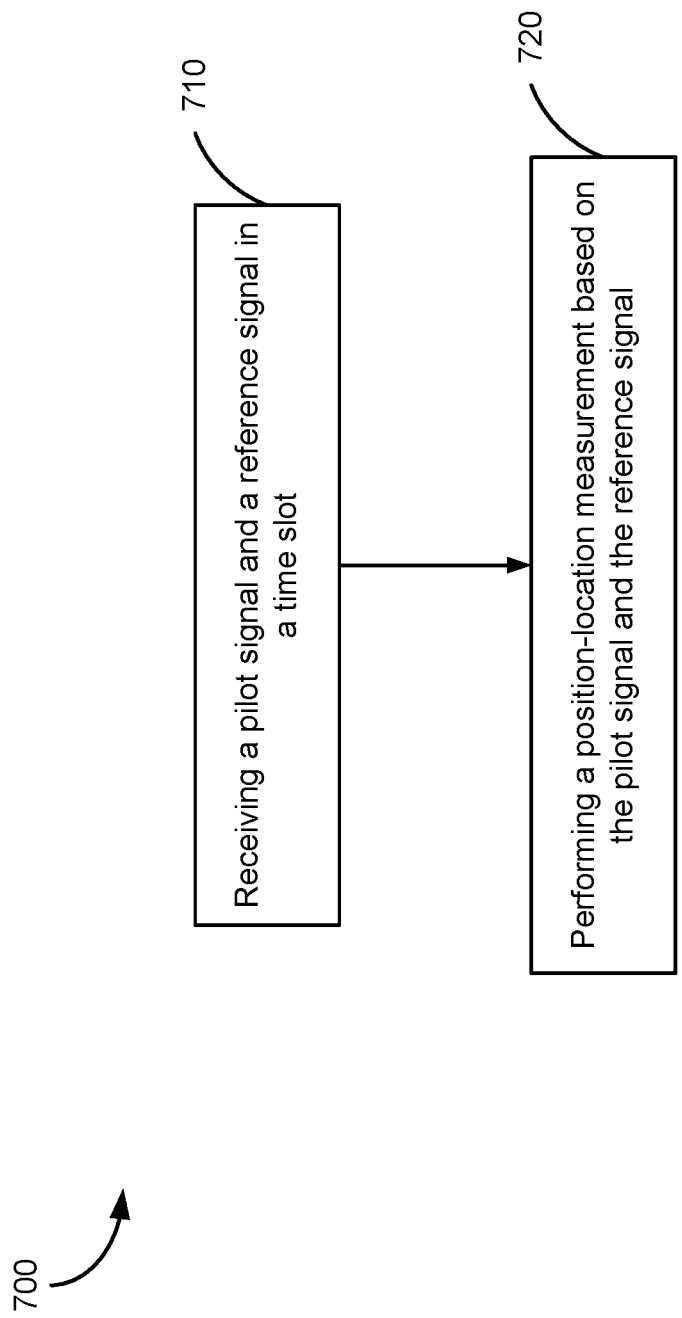
FIG. 7 illustrates a flow diagram of a process, which may be used to implement some disclosed embodiments.

FIG. 7 illustrates a flow diagram of a process 700, which may be used to implement some disclosed embodiments. Step 710 receives a pilot signal and a reference signal in a time slot (e.g., in a time-division-multiplexed or code-division-multiplexed format, such as described above). Step 730 performs a position-location measurement based on the pilot signal and the reference signal.

Process 700 may further include searching for the pilot signal. In some instances, the reference signal may be similar or substantially identical to the pilot signal, effectively providing a strong pilot for position-location measurements. In other instances, a receiving AT may use the reference signal to search for the (weaker) pilot, estimate TOA (and/or perform other position-location measurements), and report back the measured information.

Figure 8:
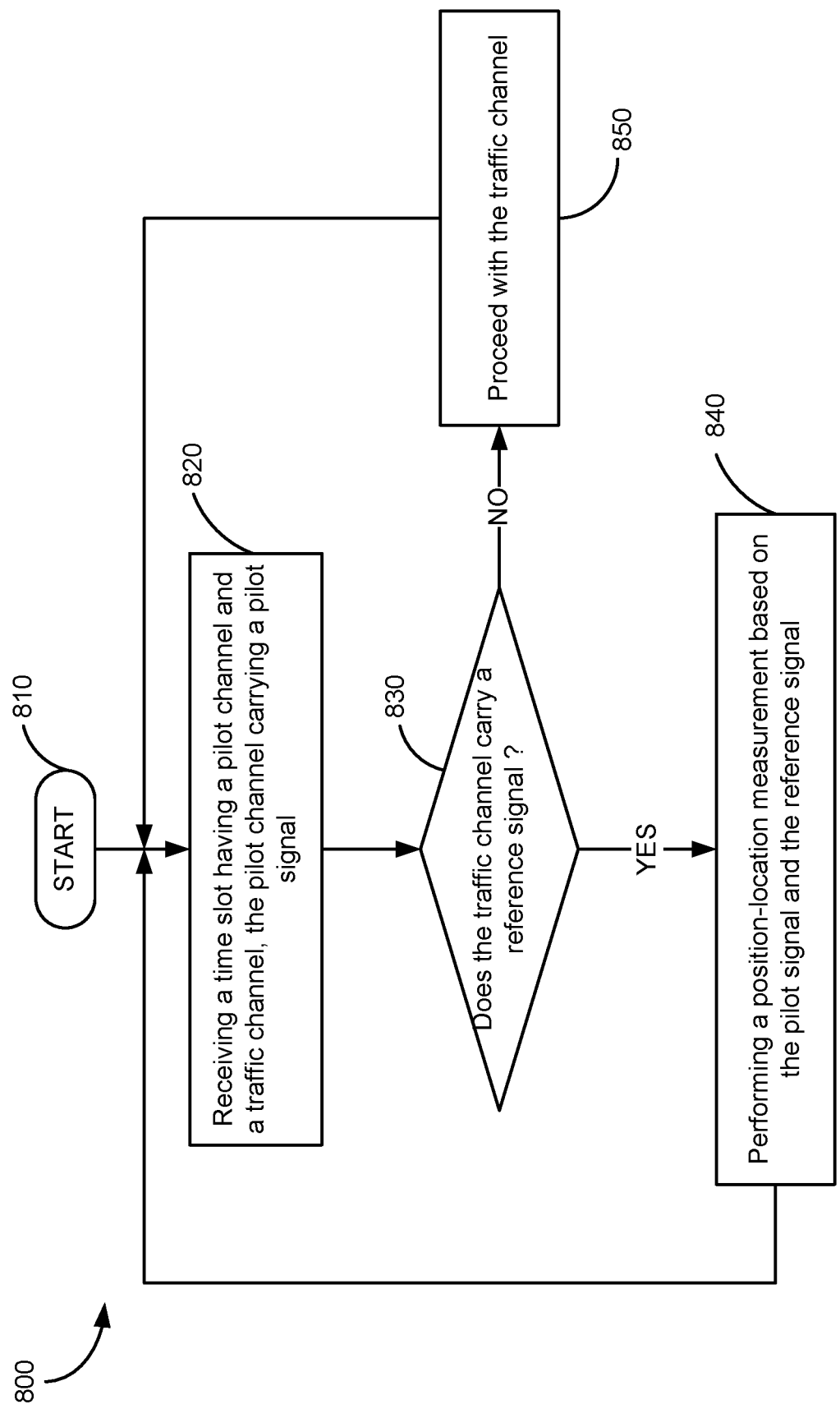
FIG. 8 illustrates a flow diagram of a process, which may be used to implement some disclosed embodiments.

FIG. 8 illustrates a flow diagram of a process 800, which may be used to implement some disclosed embodiments (such as described above). Process 800 starts at step 810. Step 820 receives a time slot having a pilot channel and a reference channel (e.g., in a time-division-multiplexed format, such as described above), the pilot channel carrying a pilot signal. Step 830 determines if the traffic channel carries a reference signal. If the outcome of step 830 is "YES," step 840 follows and performs a position-location (e.g., TOA) measurement based on the pilot signal and the reference signal. Process 800 subsequently returns to step 820. If the outcome of step 830 is "NO," step 850 follows and proceeds with the traffic channel (e.g., decode the data packets carried by the traffic channel). Process 800 subsequently returns to step 820.

Figure 9:
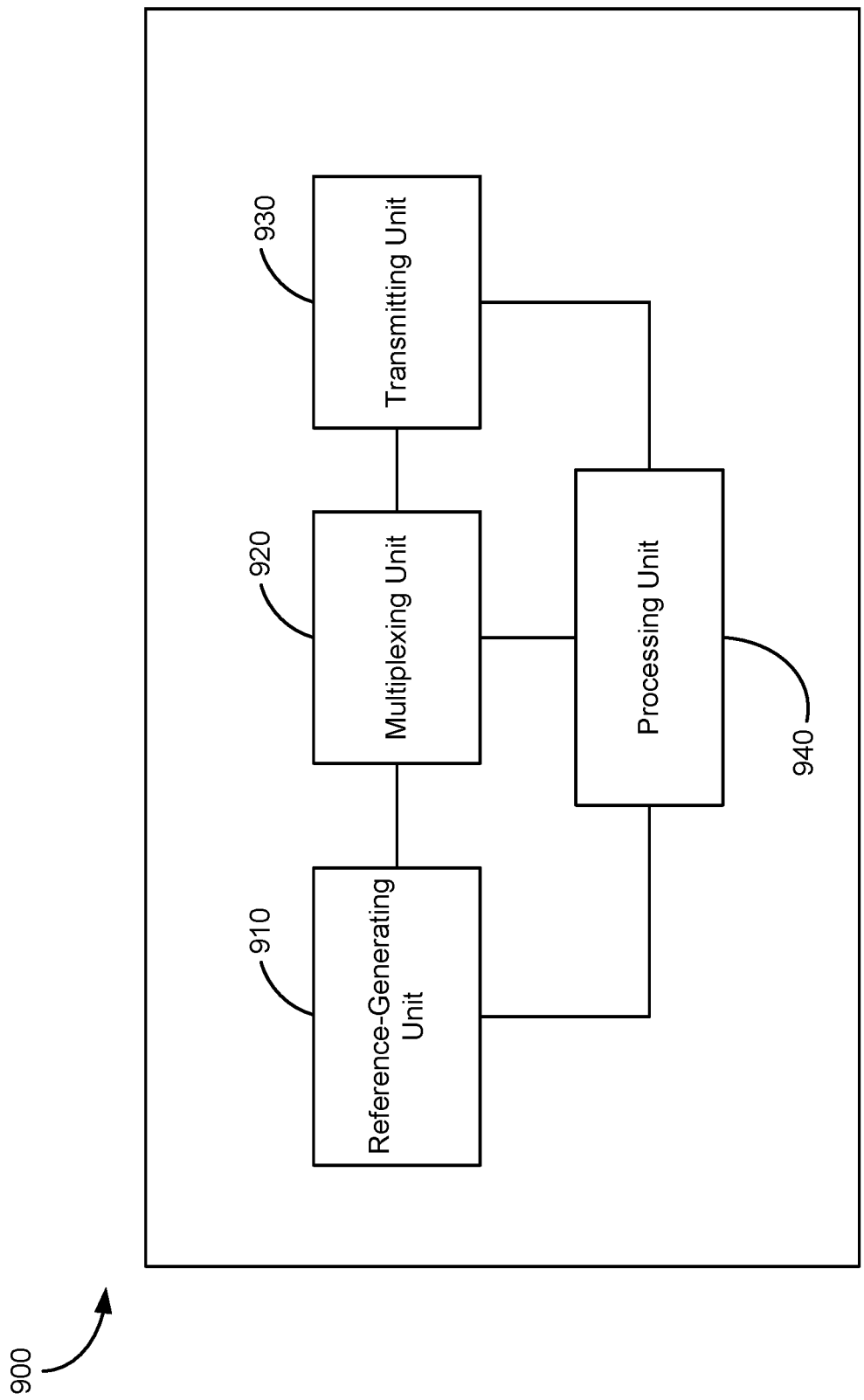
FIG. 9 illustrates a block diagram of an apparatus, in which some disclosed embodiments may be implemented.

FIG. 9 shows a block diagram of an apparatus 900, which may be used to implement some disclosed embodiments (such as described above). By way of example, apparatus 900 may include a reference-generating unit (or module) 910 configured to generate a pilot signal and a reference signal, wherein the reference signal comprising a sequence of known symbols (e.g., to one or more receiving ATs); and a transmitting unit 930 configured to transmit the pilot signal and the reference signal in a time slot. In a multi-carrier system, transmitting unit 930 may be further configured to transmit the time slot on a subset of carriers.

Apparatus 900 may also include a multiplexing unit 920 configured to multiplex the pilot signal and the reference signal into the time slot (e.g., in a time-division-multiplexed or code-division-multiplexed format, such as described above). Apparatus 900 may further include a processing unit (or controller) 940 configured to control and/or coordinate the operations of various units.

Apparatus 900 may be implemented in an AP (e.g., AP 106 in FIG. 1), or other network infrastructure elements.

Figure 10:
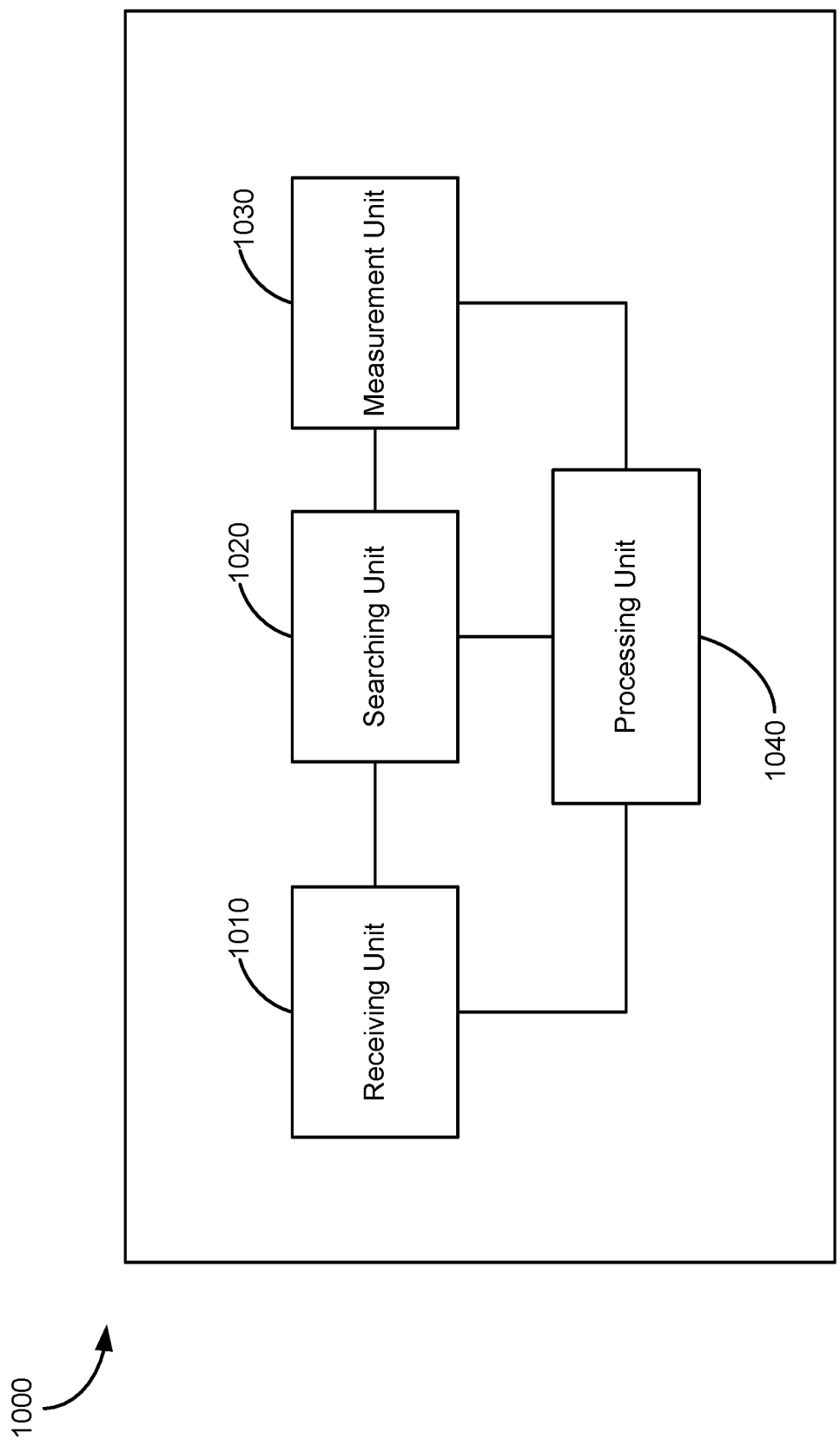
FIG. 10 illustrates a block diagram of an apparatus, in which some disclosed embodiments may be implemented.

FIG. 10 illustrates a block diagram of an apparatus 1000, which may also be used to implements some disclosed embodiments (such as described above). By way of example, apparatus 1000 may include a receiving unit 1010 configured to receive a pilot signal and a reference signal in a time slot (e.g., in a time-division-multiplexed or code-division-multiplexed format, such as described above); and a measurement unit 1030 configured to perform a position-location (e.g., TOA) measurement based on the pilot signal and the reference signal. Apparatus 1000 may further include a searching unit 1020, configured to search for the pilot signal. Apparatus 1000 may also include a processing unit (or controller) 1040, configured to control and/or coordinate the operations of various units Apparatus 1000 may be implemented in an AT, or other communication devices.

Embodiments disclosed herein (such as described above) provide some embodiments for enhancing position location in wireless communications. There are other embodiments and implementations.

Embodiments disclosed herein may be applied to a multi-carrier wireless communication system. For example, a reference transmission may be sent on some, all, or any combination of carriers.

Various units/modules in FIGS. 9-10 and other embodiments may be implemented in hardware, software, firmware, or a combination thereof. In a hardware implementation, various units may be implemented within one or more application specific integrated circuits (ASIC), digital signal processors (DSP), digital signal processing devices (DSPDs), field programmable gate arrays (FPGA), processors, microprocessors, controllers, microcontrollers, programmable logic devices (PLD), other electronic units, or any combination thereof. In a software implementation, various units may be implemented with modules (e.g., procedures, functions, and so on) that perform the functions described herein. The software codes may be stored in a memory unit and executed by a processor (or a processing unit). The memory unit may be implemented within the processor or external to the processor, in which case it can be communicatively coupled to the processor via various means known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), electrically programmable ROM (EPROM), electrically erasable programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in an AT. In the alternative, the processor and the storage medium may reside as discrete components in an AT.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An access terminal (AT), comprising:
a receiving unit configured to:
receive a pilot signal, in a time slot, carried in a pilot channel;
receive a reference signal in the time slot, the reference signal comprising a sequence of symbols known to the AT before being received, wherein the reference signal is carried in a traffic channel or control channel and the reference signal is different from the pilot signal; and
a measurement unit configured to determine a position location of the AT based at least in part on the reference signal.

2. The AT of claim 1, wherein determining the position location of the AT is further based on the pilot signal.

3. The AT of claim 2, wherein the pilot signal and the reference signal are time-division-multiplexed.

4. The AT of claim 2, wherein the pilot signal and the reference signal are code-division-multiplexed.

5. The AT of claim 1, wherein a pattern of the pilot signal is the same as a pattern of the reference signal.

6. The AT of claim 1, wherein determining the position location of the AT comprises using time difference of arrival (TDOA) measurements.

7. The AT of claim 1, wherein determining the position location of the AT comprises performing a position location measurement.

8. The AT of claim 1, wherein the receiving unit is further configured to receive the reference signal on a periodic basis.

9. A method for wireless communications, comprising:
receiving a pilot signal, in a time slot, carried in a pilot channel;
receiving a reference signal in the time slot, the reference signal comprising a sequence of symbols known to the AT before being received, wherein the reference signal is carried in a traffic channel or control channel and the reference signal is different from the pilot signal and
determining a position location of the AT based at least in part on the reference signal.

10. The method of claim 9, wherein determining the position location of the AT is further based on the pilot signal.

11. The method of claim 10, wherein the pilot signal and the reference signal are time-division-multiplexed.

12. The method of claim 10, wherein the pilot signal and the reference signal are code-division-multiplexed.

13. The method of claim 9, wherein a pattern of the pilot signal is the same as a pattern of the reference signal.

14. The method of claim 9, wherein determining the position location of the AT comprises using time difference of arrival (TDOA) measurements.

15. The method of claim 9, wherein determining the position location of the AT comprises performing a position location measurement.

16. The method of claim 9, wherein receiving the reference signal is on a periodic basis.

17. An access terminal (AT), comprising:
means for receiving a pilot signal, in a time slot, carried in a pilot channel;
means for receiving a reference signal in the time slot, the reference signal comprising a sequence of symbols known to the AT before being received, wherein the reference signal is carried in a traffic channel or control channel and the reference signal is different from the pilot signal; and
means for determining a position location of the AT based at least in part on the reference signal.

18. The AT of claim 17, wherein determining the position location of the AT is further based on the pilot signal.

19. The AT of claim 18, wherein the pilot signal and the reference signal are time-division-multiplexed.

20. The AT of claim 18, wherein the pilot signal and the reference signal are code-division-multiplexed.

21. The AT of claim 17, wherein a pattern of the pilot signal is the same as a pattern of the reference signal.

22. The AT of claim 17, wherein the means for determining the position location of the AT comprises means for using time difference of arrival (TDOA) measurements in determining the position location.

23. The AT of claim 17, wherein the means for determining the position location of the AT comprises means for performing a position location measurement.

24. The AT of claim 17, wherein the means for receiving the reference signal comprises means for receiving the reference signal on a periodic basis.

25. A non-transitory computer-readable medium for wireless communications, the medium storing one or more programs containing instructions that, when executed by a processor of an access terminal (AT), cause the AT to perform operations comprising:
receiving a pilot signal, in a time slot, carried in a pilot channel;
receiving a reference signal in the time slot, the reference signal comprising a sequence of symbols known to the AT before being received, wherein the reference signal is carried in a traffic channel or control channel and the reference signal is different from the pilot signal; and determining a position location of the AT based at least in part on the reference signal.

26. The non-transitory computer-readable medium of claim 25, wherein determining the position location of the AT is further based on the pilot signal.

27. The non-transitory computer-readable medium of claim 26, wherein the pilot signal and the reference signal are time-division-multiplexed.

28. The non-transitory computer-readable medium of claim 26, wherein the pilot signal and the reference signal are code-division-multiplexed.

29. The non-transitory computer-readable medium of claim 25, wherein a pattern of the pilot signal is the same as a pattern of the reference signal.

30. The non-transitory computer-readable medium of claim 25, wherein execution of the instructions for determining the position location of the AT causes the AT to use time difference of arrival (TDOA) measurements in determining the position location.

31. The non-transitory computer-readable medium of claim 25, wherein execution of the instructions for determining the position location of the AT causes the AT to perform a position location measurement.

32. The non-transitory computer-readable medium of claim 25, wherein execution of the instructions for receiving the reference signal causes the AT to receive the reference signal on a periodic basis.

* * * * *